Sept. 22, 1925.

H. E. BAILEY

POWDERED FUEL FEEDER

Filed Feb. 5, 1923

1,554,701

Inventor:
Harrison E. Bailey,
by
His Attorney.

Patented Sept. 22, 1925.

1,554,701

UNITED STATES PATENT OFFICE.

HARRISON E. BAILEY, OF ERIE, PENNSYLVANIA, ASSIGNOR TO GENERAL ELECTRIC COMPANY, A CORPORATION OF NEW YORK.

POWDERED-FUEL FEEDER.

Application filed February 5, 1923. Serial No. 617,191.

*To all whom it may concern:*

Be it known that I, HARRISON E. BAILEY, a citizen of the United States, residing at Erie, county of Erie, State of Pennsylvania, have invented certain new and useful Improvements in Powdered-Fuel Feeders, of which the following is a specification.

The present invention relates to apparatus for burning powdered fuel, such as powdered coal, in furnaces and has for its object to provide an improved powdered fuel feeder for mixing the powdered fuel and air and feeding it to the furnace.

For a consideration of what I believe to be novel in my invention attention is directed to the accompanying description and the claims appended thereto.

Figure 1:
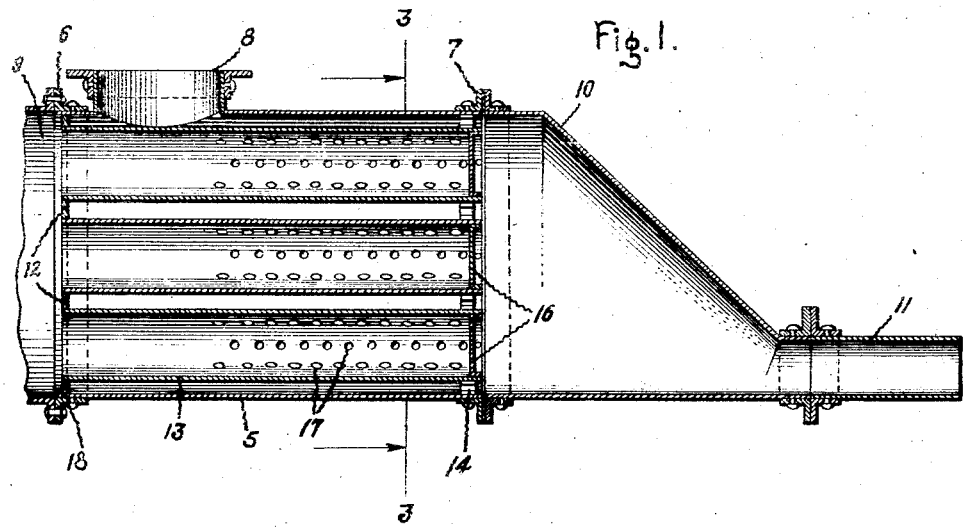
Figure 2:
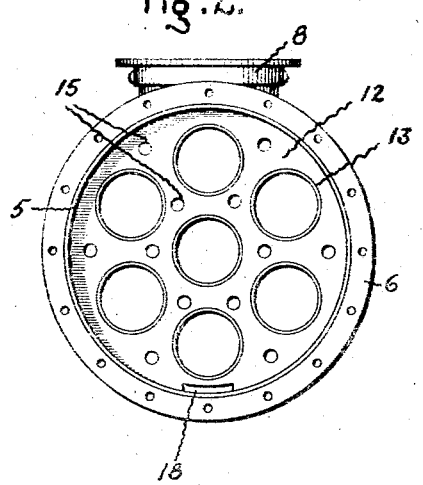
Figure 3:
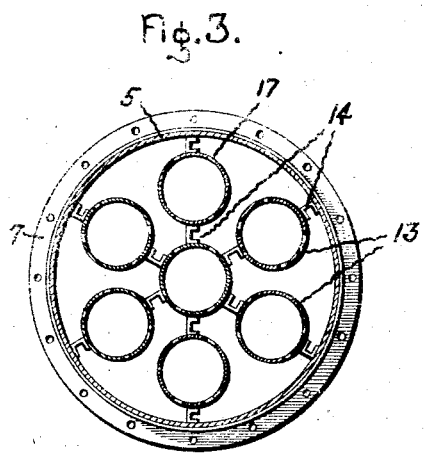

In the drawing, Fig. 1 is a longitudinal sectional view of a powdered fuel feeder embodying my invention; Fig. 2 is an end view thereof, and Fig. 3 is a transverse sectional view taken on line 3—3, Fig. 1.

Referring to the drawing, 5 indicates a cylindrical casing provided with a flange 6 at its admission end and a flange 7 at its discharge end. Connected to the upper side of casing 5 is a conduit 8 through which the mixture of powdered fuel and primary air is supplied to the feeder. This mixture of fuel and primary air may be supplied by means of any suitable arrangement adapted for the purpose, arrangements for this purpose being well known in this art. Connected to flange 6 is a conduit 9 for supplying secondary air to the fuel feeder. The primary air and secondary air may be obtained from any suitable source of supply. Connected to flange 7 is a discharge conduit which terminates in a discharge nozzle 11 through which the mixture of fuel and air is supplied to the furnace. The discharge conduit is suitably shaped so that it gradually decreases in cross sectional area whereby it serves to convert pressure of the mixture passing through it into velocity in the well-understood manner.

At the admission end of casing 5 is a tube sheet 12 provided with openings in which are fixed the admission ends of a number of spaced tubes 13. I preferably employ a central tube surrounded by a series of outer tubes. Tubes 13 extend the length of casing 5 and their discharge ends are supported by suitable spacers 14. In tube sheet 12 are a number of spaced holes 15 for the passage of a limited amount of secondary air. The discharge ends of tubes 13 are closed by suitable heads 16. The tubes 13 are rows of holes 17. In the tube sheet 12 at its lowermost point is a rectangular opening 18.

In use, the powdered fuel and primary air enter through conduit 8 and circulate down around the tubes 13 at the same time making a right angle turn and flowing toward the discharge end of casing 5 this movement being assisted by the secondary air flowing through holes 15. The secondary air entering through conduit 9 flows into tubes 13 and from them is discharged radially outward through holes 17 thus striking at a right angle into the axially flowing mixture of primary air and fuel. This sets up a swirling action which serves to effect a very thorough mixing of the fuel and air and maintains an intimate mixture until the fuel and air pass into discharge conduit 10. In a fuel feeder, it is very important that fuel be prevented from separating out of the mixture and settling on the bottom of casing 5 as this will soon clog up the feeder. By my improved arrangement operating as above described, there is little opportunity for any fuel to settle because of the continuous mixing action which takes place. However, should any fuel tend to settle out it will be picked up by secondary air flowing through opening 18 and carried to the discharge conduit. In other words, the provision of opening 18 serves to prevent any fuel settling onto the bottom of casing 5.

In addition to the effectiveness of my apparatus in forming an intimate uniform mixture of air and powdered fuel, it has also the advantage that it is simple in structure and can be made from standard parts whereby it can be manufactured at a low cost.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a fuel mixer for powdered fuel burners and the like, the combination of a casing, a tube sheet at one end of the casing, a plurality of tubes arranged side by side in the casing in spaced relation to each other, one end of each tube being supported in the tube sheet, means closing the other ends of the tubes, a conduit connected to the casing through which air and fuel may be supplied to the spaces between the tubes, a conduit connected to the end of the casing adjacent to the tube sheet for supplying air to said tubes, said tubes being provided with openings in their side walls for the discharge of air, and a conduit connected to the casing at the end remote from that at which the tube sheet is located for conveying away the mixture of fuel and air.

2. In a fuel mixer for powdered fuel burners and the like, the combination of a casing, a tube sheet at one end of the casing, a plurality of tubes arranged side by side in the casing in spaced relation to each other, one end of each tube being supported in the tube sheet, means closing the other ends of the tubes, a discharge conduit leading from the casing adjacent to the closed ends of the tubes, a conduit connected to the casing through which air and fuel may be supplied to the spaces between the tubes and a conduit connected to the end of the casing adjacent to the tube sheet for supplying air to said tubes, said tubes being provided with openings in their side walls for the discharge of air, and said tube sheet being provided with an opening at its bottom edge through which air may flow to the bottom of the casing to prevent fuel from settling thereon.

3. In a powdered fuel feeder, the combination of a casing, a tube sheet mounted in the casing at one end, a plurality of tubes arranged side by side in the casing in spaced relation to each other, and having open ends mounted in the tube sheet and their other ends closed, means supporting the closed ends of the tubes, a conduit connected to the end of the casing adjacent to the tube sheet, through which air is supplied to all said tubes, said tubes being provided in their walls with openings for the discharge of air, a conduit for supplying fuel to the spaces between said tubes, and a discharge conduit connected to the casing at its opposite end for receiving the mixture of fuel and air discharged from the spaces between the tubes.

In witness whereof, I have hereunto set my hand, this 27th day of January, 1923.

HARRISON E. BAILEY.